May 17, 1960 G. E. GERHARDT 2,936,953

APPARATUS FOR EXTRACTING PARTICLE SIZE DATA

Filed Sept. 13, 1956 7 Sheets-Sheet 1

INVENTOR.
GERARD ERNEST GERHARDT,
BY Robert Ames Norton
ATTORNEY.

APPARATUS FOR EXTRACTING PARTICLE SIZE DATA

INVENTOR.
GERARD ERNEST GERHARDT,
BY Robert Ames Norton
ATTORNEY.

APPARATUS FOR EXTRACTING PARTICLE SIZE DATA

INVENTOR.
GERARD ERNEST GERHARDT,
BY
ATTORNEY.

INVENTOR.
GERARD ERNEST GERHARDT,
BY Robert Ames Norton
ATTORNEY.

INVENTOR.
GERARD ERNEST GERHARDT,
BY Robert Ames Norton
ATTORNEY.

INVENTOR.
GERARD ERNEST GERHARDT,
BY Robert Ames Norton
ATTORNEY.

APPARATUS FOR EXTRACTING PARTICLE SIZE DATA

Filed Sept. 13, 1956 7 Sheets-Sheet 7

INVENTOR.
GERARD E. GERHARDT
BY
ATTORNEY

United States Patent Office 2,936,953

Patented May 17, 1960

2,936,953

APPARATUS FOR EXTRACTING PARTICLE SIZE DATA

Gerard Ernest Gerhardt, Plainfield, N.J., assignor to American Cyanamid Company, New York, N.Y., a corporation of Maine Application September 13, 1956, Serial No. 609,745

4 Claims. (Cl. 235—92)

This invention relates to a device for electronically counting particles and, in a more specific aspect, to a device for counting particles above a set, predetermined size.

The counting of small particles has become a necessity in many fields of industry. Thus, for example, counts are of importance in suspension of pigments, bacteria, blood corpuscles, particles to impart soil resistance to fibrous materials, and the like. It is also important in many cases to determine the number of particles in certain size ranges, so-called differential counts.

In the past, particle counting has largely been done manually, for example by counting the number of particles in a given area on a microscope slide using a suitable reticle in the microscope optics, counting particles on micrographs either from visual or electron microscopes and the like. Indirect methods have also been used, such as centrifuging, sedimentation and light scattering. These methods in some cases give reliable results, but they require a very long time; and the strain of long microscope observation or counting on personnel can be serious and, of course, as in any counting operation by human beings, the human error is always a serious possibility.

Certain proposals have been made to count particles automatically, for example the area in which the count is to be made, such as a microscope slide, has been scanned by split beams of light from a single source which scan the area together with two photocells, one of which can see one beam, and the other, the other. As the beams are interrupted by particles, light pulsation in the photocells results which, in the case of rapid scanning, will normally be at video frequency. The outputs of the two photocells are then fed into electronic circuits using gated amplifiers, the output of one beam, the guard beam or its spot of light in the scanning operation which is sometimes referred to as the guard spot, controls the gate of the amplifier, whereas the output of the other beam constitutes the amplifier input signal. Pulse polarity is such that the amplifier gate is only open so long as the guard beam encounters no particle. In other words, there will be one amplified pulse when the counting beam is interrupted by the particle at a point where the guard beam is not so interrupted. A single pulse results for each particle and can be counted by a conventional scaler or digital computer fed from the output of the gated amplifier.

The above proposal was not practical. The adjustment of photocells and beams is extraordinarily critical and cross-talk between the two outputs is almost impossible to suppress. Severe light attenuation is an added disadvantage.

Some of the disadvantages of the multiple-photocell, multiple-beam method described above have been overcome by using a flying spot scanning a raster on a cathode ray tube, coupled with a delay line from the output of a single photocell equal to the period of a horizontal scanning line. The output from the delay line therefore gives a signal corresponding to that which would have been produced by a guard beam and its separate photocell. This in effect splits the signal output of the photocell electronically instead of splitting the beam. The device, while more reliable, is still by no means a perfect answer, and it is with improvements to a device using a single beam and single photocell to which the present invention relates.

Neither of the proposed electronic counters described above are capable of satisfactory differential counts, that is to say of counting only particles above a certain size range. This problem still remains for direct solution, and the less accurate indirect methods referred to above were still needed, with all their time-consuming disadvantages and liability to human error. The present invention, in a specific aspect, solves the problem by eliminating respondence from particles having horizontal dimension below a predetermined minimum.

The invention will be described in greater detail in conjunction with the drawings in which.

Figure 1:
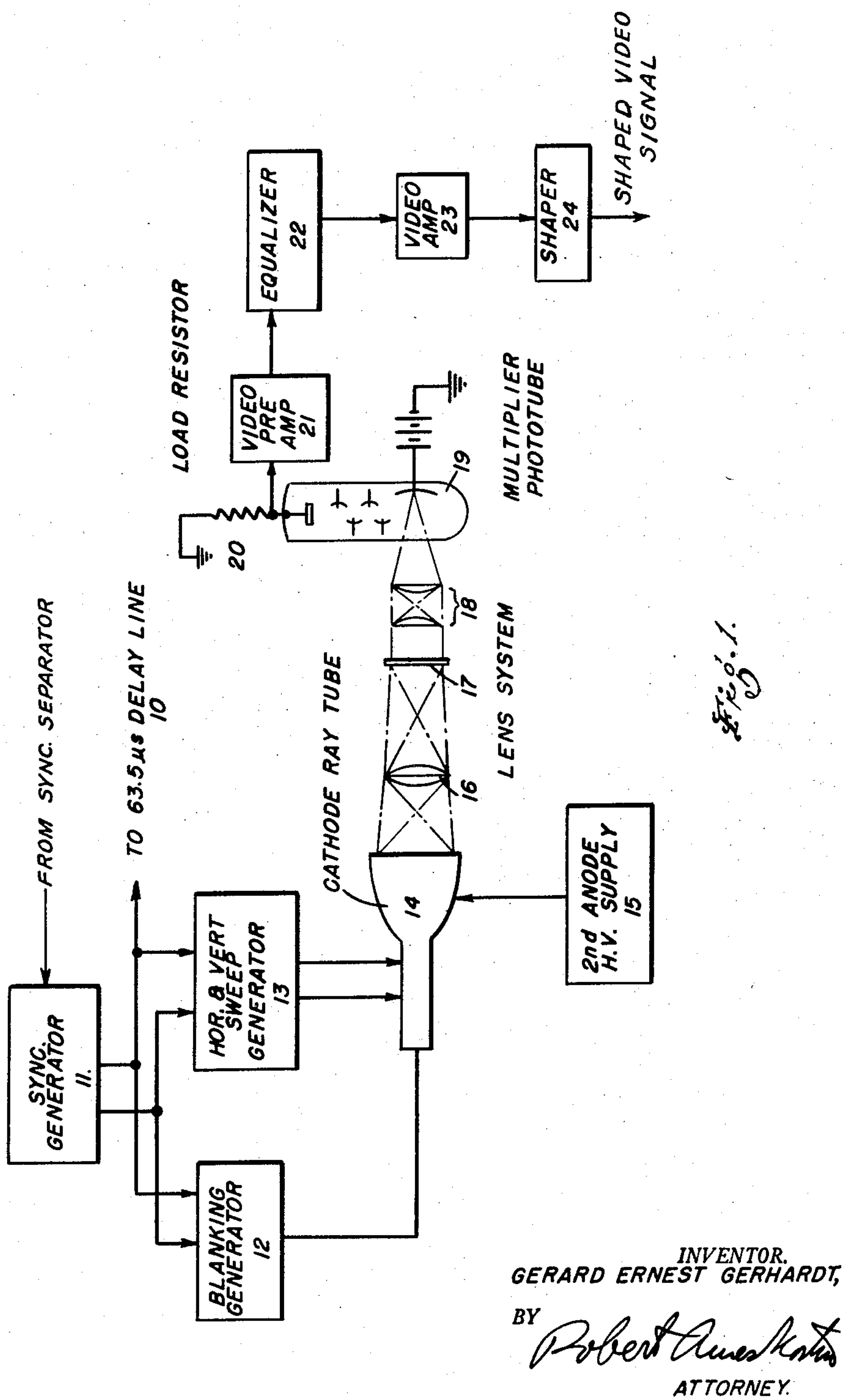
Fig. 1 is a diagram of the optics and block diagram of the electronic circuits producing the video output.

In Fig. 1 there is shown a cathode ray tube 14 of the high-intensity, short-persistence type, such as a 5ZP16, the second anode of which is fed from a high-voltage supply 15. Scanning of the raster on the tube 14 is effected by a conventional sync generator 11 which feeds a horizontal and vertical sweep generator 13 timed by the sync generator 11 which also controls a blanking generator 12 for eliminating retracing. The sync generators, sweep generators, blanking generator and voltage supplies to the cathode ray tube are conventional, and these sections of the circuit are therefore shown diagrammatically as their particular design forms no part of the present invention.

The bright flying spot on the face of the cathode ray tube traces out a raster which is focused by the lens system 16 onto the transparent field 17 in which particles are to be counted and which in practice will usually be a microscope slide, photographic transparency or the like. As the field to be counted is normally smaller than the raster on the cathode ray tube, the image is reduced in size, which serves to further reduce the size of the flying spot and hence increases the precision with which particles are counted.

Figure 2:
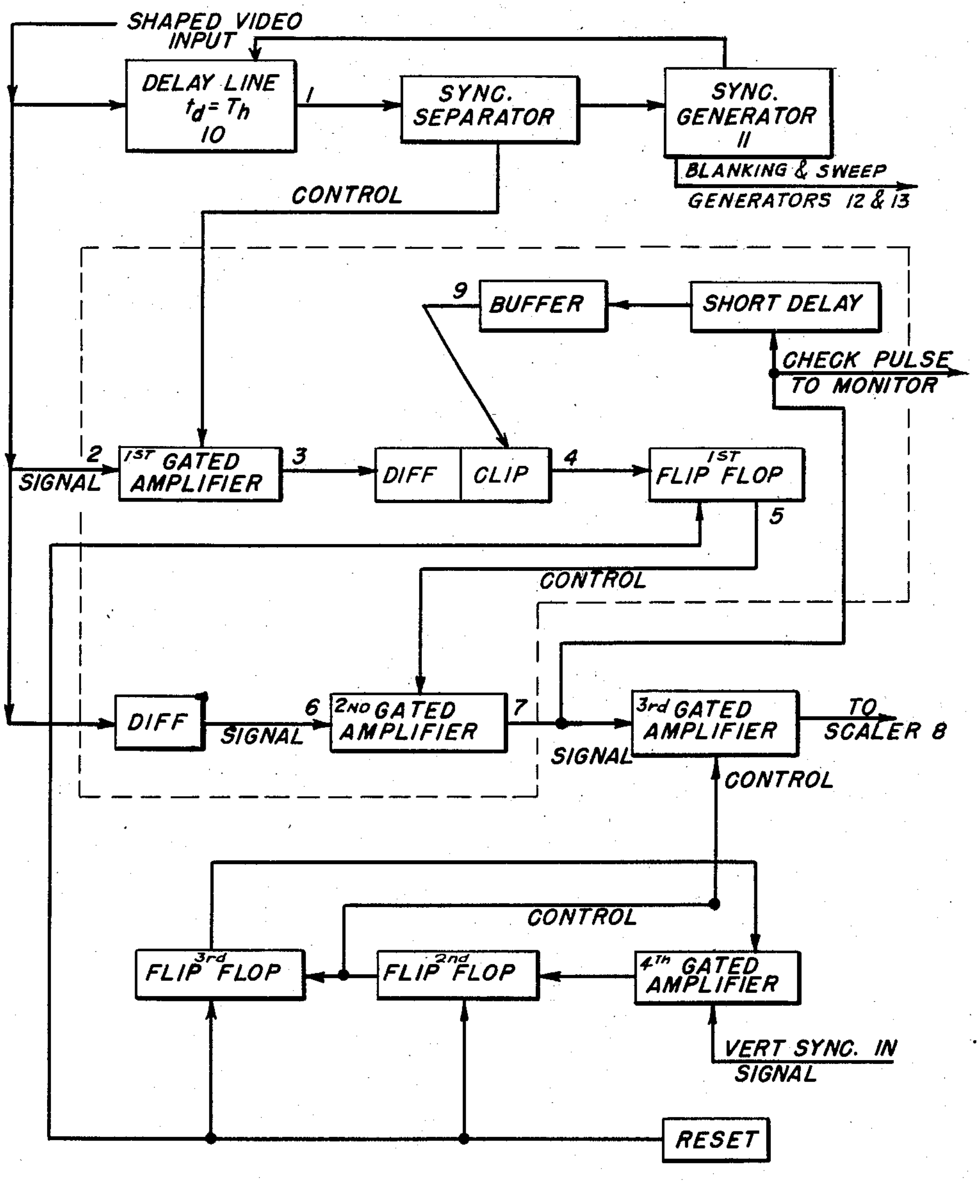
Fig. 2 is a block diagram of the main electronic circuits.

The light passing through the slide or transparency 17 is focused onto the cathode of a multiplier phototube 19 shown in diagrammatic form. The tube output from the load resistor 20 is passed through a video preamplifier 21, equalizer 22 and video amplifier 23. The amplifiers are of conventional design. The output from amplifier 23 passes to a shaper 24. A portion of the output of the amplifier is connected to a conventional monitoring kinescope (not shown). Likewise, there is a connection from the output of the sync generator 11 to a delay line 10 shown in Fig. 2, this delay line in a standard circuit designed to introduce a delay of 63.5 μs. The delay line receives pulses at horizontal sync frequency and also shaped pulses from the shaped 24, to the output of which it is connected (Fig. 2). The output point 1 of the delay line corresponds to the preceding line on the raster and acts as a guard beam or spot. At the same time there appears in the output of the shaper the output signal from the next scanning line, which is the active one.

Figure 5:
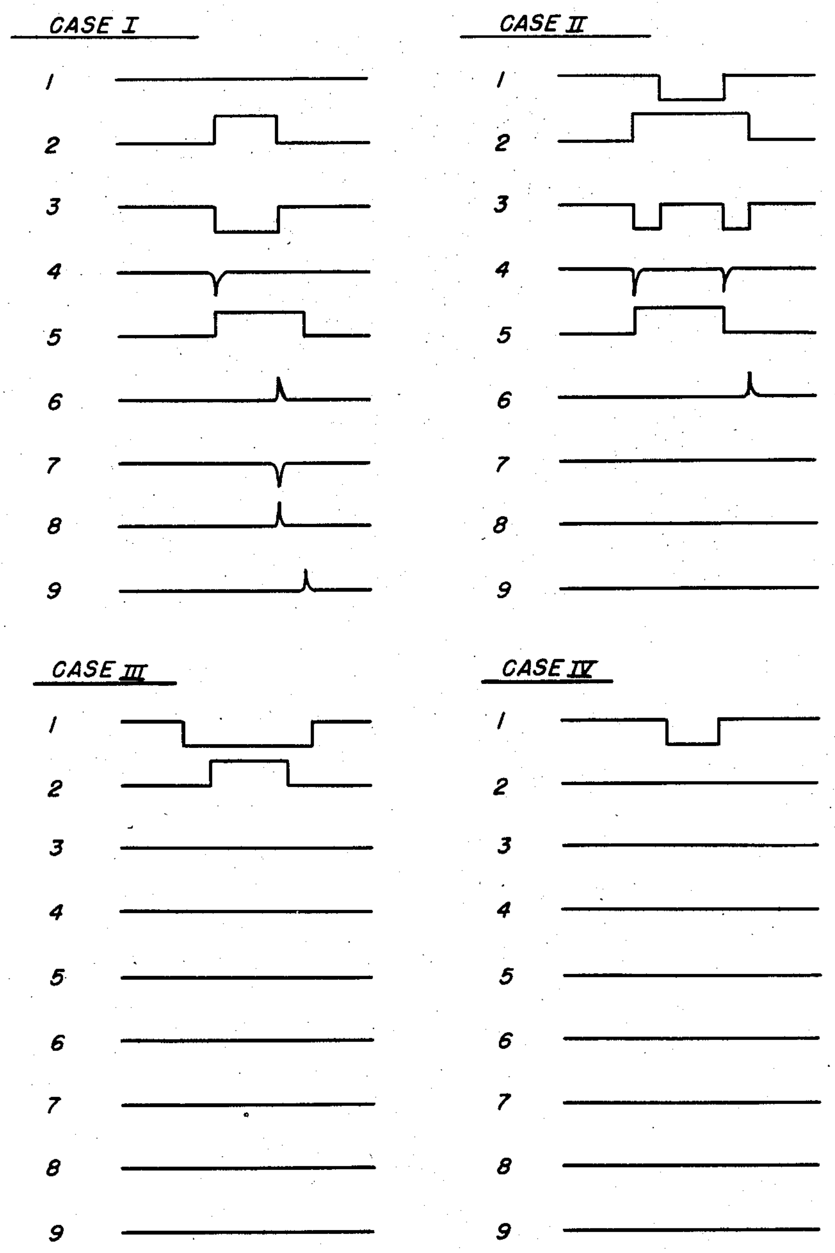
Fig. 5 is a series of wave forms observable at various numbered points on Fig. 2 for the four cases illustrated in Fig. 4.
Figure 4:
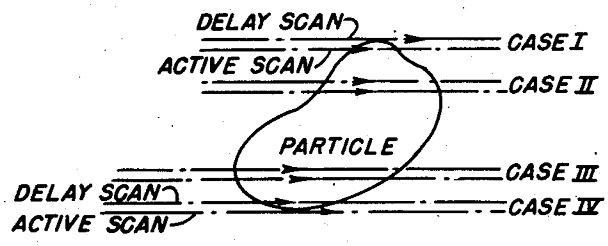
Fig. 4 is a plan view of scanning beams encountering a particle.

The effect of scanning is shown in Figs. 4 and 5 and will be described before continuing the description of the electronic circuits. Fig. 4 shows an enormously enlarged image of a portion of the microscope slide or transparency 17 scanned by the beam from the flying spot. Two beams are illustrated for Case I in which the upper beam is derived from the delay line 10 and the lower is the active scanning beam. As the delay line causes the signal from the delayed beam to appear contemporaneously with the active scanning beam, the wave forms appear as at 1 and 2 in Fig. 5, the numerals referring to the numbered points appearing on Fig. 2. It will be seen that in Case I the delayed beam does not encounter a particle at the instant illustrated and therefore shows no negative pulse; whereas the active scanning beam does encounter a particle edge, passing through a comparatively short dimension thereof, and appears at point 2 on Fig. 2 as a shaped positive square pulse of fairly short duration.

In Case II, where both the delayed beam and the active beam encounter the particle, the latter encountering a larger dimension, a negative shaped pulse appears at the end of the delay line at 1 and a somewhat longer square positive pulse appears at 2. In Case III both beams encounter the particle but the dimensions are reversed and the negative pulse at 1 is now longer than the positive pulse at 2. Case IV deals with the situation where the delayed beam just strikes the particle, whereas the succeeding line scanned by the active beam misses the particle. In this case Fig. 5 shows only the fairly short negative pulses which appears at 1.

The output of the delay line in Fig. 2 contains both signal from the phototube 19 and horizontal sync signal from the sync generator. These two signals are then passed through a conventional sync separator circuit where the sync pulses are separated out and fed into the sync generator 11. The delayed horizontal sync pulses equate the period of the horizontal sync oscillator to that of the delay line. This prevents drifting and assures that the delay scan and active scan are always spaced one line on the raster.

The video portion of the signal from the sync separator passes into the control input of the first gated amplifier, the input to the amplifier at 2 receiving signal from the shaper 24; that is to say, a signal corresponding to the active scan. The signal input at 2 appears in the output of the first gated amplifier at 3 only during the period when there is no video pulse from the delay line caused by the scanning spot in the preceding horizontal line striking a particle. The negative pulse closes the gate in the amplifier. The output wave form 3 for the four cases shown in Fig. 4 will be seen in Fig. 5. When the first gated amplifier is open, as in Case I, the signal pulse appears as a negative pulse of the same duration as the input signal, phase reversal resulting from a single-stage gated amplifier. In the Cases III and IV, where the gated amplifier is closed for at least as long as there is any signal, no signal appears at 3. On the other hand, in Case II, where the signal pulse is longer than the gating pulse, two short negative pulses appear at 3.

The output from the first gated amplifier is then passed through a differentiating and a negative clipping circuit and emerges as sharp pulses corresponding to the leading edge of the video pulse. The sharp pulse is in the same phase as at 3. The pulse corresponding to the trailing edge is eliminated.

Figure 9:
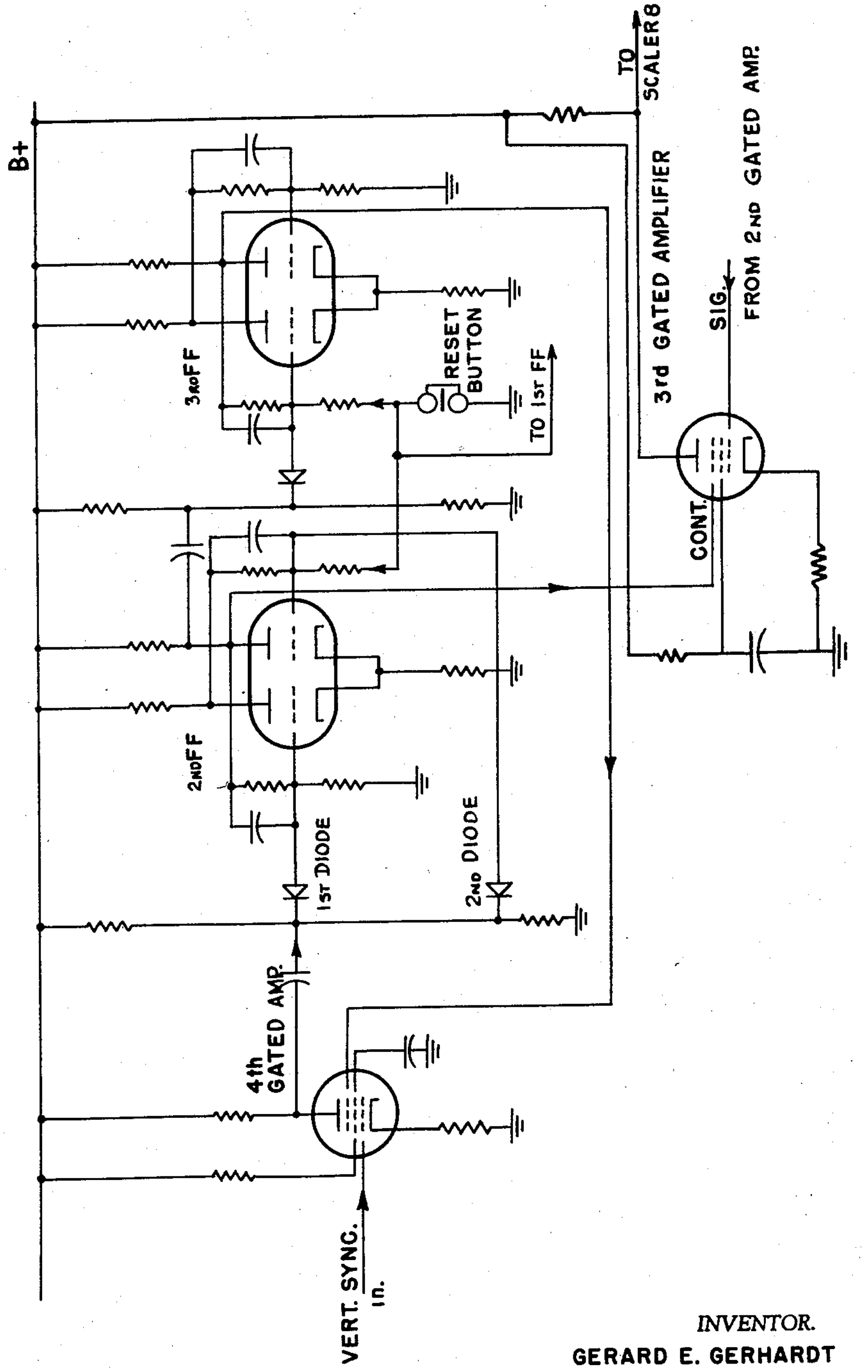
Fig. 9 is a schematic of the resetting circuits of Fig. 2.

The output then goes to a first flip-flop circuit which produces a positive square pulse at its output 5. This signal enters the second gated amplifier as control for the gate, holding it open only so long as the positive pulse continues. The signal for the second gated amplifier is a sharp spike produced from the trailing edge of the pulse from the original shaper 24 which passes through another differentiating circuit. Wave forms at the positions 5 and 6 appear on Fig. 5 in Cases I and II, and the amplified wave form at the output of the second gated amplifier at 7 likewise appears. This in turn is the signal for a third gated amplifier which is controlled by the vertical sync passing through a fourth gated amplifier and a second flip-flop circuit, the latter furnishing control for said third gated amplifier. The result of the circuit is, of course, to reset after each vertical field. The wiring diagram for the manual resetting shown at the bottom of Fig. 2 is illustrated in Fig. 9 in which the sequence of the vertical sync input signal is shown conventionally from left to right. In Fig. 2, for sake of symmetry, the blocks are shown with the vertical sync input signal entering at the right. The following description will refer to Fig. 9.

Figure 3:
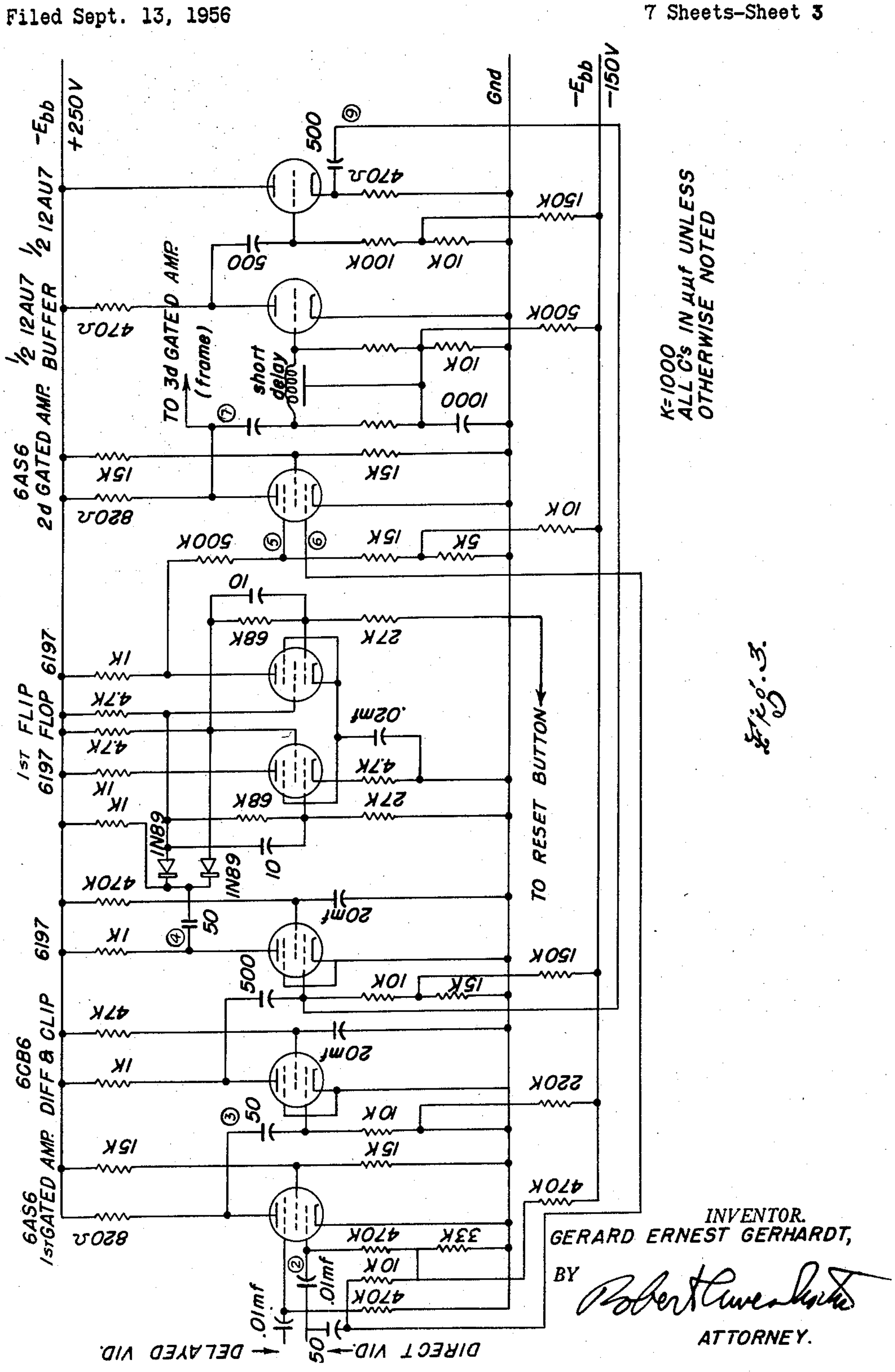
Fig. 3 is a schematic of the wiring of the portion of Fig. 2 enclosed in the dashed rectangle.

Manual resetting is provided in conventional manner by a grounded reset button, so labeled in Figs. 2 and 9. The reset button which is a normally closed switch, as is customary, connects the grids of the second tube of the first flip-flop, the second half of the tube of the second flip-flop and the first half of the tube of the third flip-flop through suitable resistors to ground. In its normal position, the second half of the tube of the third flip-flop is conducting, as is the second half of the tube of the second flip-flop. The plates being both negative, the control grids of the fourth gated amplifier and of the third gated amplifier, which feeds the scaler at 8 in Fig. 2, are both closed. Accordingly, no signals reach the scaler, and vertical sync input signals are not amplified. The first flip-flop between positions 4 and 5 of Figs. 2 and 3 is likewise grounded and operates normally. When the reset button is pushed to the open position, the first half of the tube of the third flip-flop receives positive voltage from B+. This half of the tube therefore starts to conduct, throwing a negative voltage on the grid of the second half of the tube which is cut off. In other words, the third flip-flop is flipped. The cut off of this second half of the tube puts a positive voltage on the suppressor grid of the fourth gated amplifier and, therefore, opens this fourth amplifier gate so that vertical sync signals can now be amplified. However, as long as the reset button is held in, the grid return of the second half of the tube of the second flip-flop is open and, hence, the flip-flop is ineffective. As soon as the reset button is released the last-mentioned grid return is closed, and the next vertical sync pulse is amplified by the fourth gated amplifier; and the positive pulse, after passing through the first diode, causes the second flip-flop to flip, the first half of the tube becoming conductive and second half of the tube cut off. The plate of the latter becomes positive and imparts its positive voltage to the gate of the third gated amplifier leading to the scaler (Figs. 2 and 3). Accordingly, video pulses during the whole of the vertical scanning field are passed through the rest of the system, as described above, and if the delay line does not signal the presence of corresponding particles in the preceding line the particles are counted by the scaler.

When the vertical scanning field has gone through one cycle, the next vertical sync pulse passes through the second diode (Fig. 9) in the form of a positive pulse to the second half of the tube of the second flip-flop. This causes conduction in the tube, resetting the flip-flop to the original position, and hence, closing the gate of the third gated amplifier to the scaler. The third flip-flop flops back to its original position and puts a negative voltage on the gate of the fourth gated amplifier. No further vertical sync pulses are amplified until the reset button is again pressed and released. As a result a single vertical field is scanned and the pulses counted by the scaler. If it is desired to count more than one vertical field, more flip-flops are used. These circuits are conventional in design.

The output at 8 from the third gated amplifier, which has a wave form shown in Fig. 5, then passes to the input of a conventional scaler or a digital counter which is not shown.

It will be noted that in Case I the pulse in the output of the first flip-flop circuit at 5 is limited in duration. Otherwise, the second gated amplifier would be kept open indefinitely until the next pulse struck the input to the flip-flop, and this would make it possible to get a confused reading from a subsequent particle if both beams struck the particle because, while the delay beam would close the gate in the first gated amplifier and therefore the signal coming in at 2 would not be passed on, the second gated amplifier would remain open, and the signal from the active scan, after differentiation, would enter at 6. In other words, if the subsequent particle were struck by both beams, it would be counted a second time. It is to prevent this inaccuracy that one of the important features of the present invention is provided, which feature will now be described.

A portion of the negative-going pulse from the output of the second gated amplifier at 7 is passed through a delay circuit into a buffer amplifier having one stage, the output being at 9. The resulting positive pulse, which is slightly delayed, is applied to the clipping circuit, where phase reversal takes place and hence a negative pulse is applied to the clipper ahead of the first flip-flop. Thus, when the beams encounter a subsequent particle in the scan, the circuits are in preset condition, and so there will be no count if both the delay beam and the active scanning beam encounter the particle. Within the resolution limits of the instrument, the count of each particle will always be exact, regardless of the relative positions and sizes of the particles, and a fully accurate, automatically resetting counting circuit is provided.

Fig. 3 illustrates a typical schematic circuit covering the portion of the block diagram in Fig. 2 enclosed within the dashed lines. The first gated amplifier, a 6AS6, is connected in conventional manner. The differentiating is accomplished by a condenser, and resistor; clipping is done by a 6CB6; the clipped pulse is amplified by a 6197; and it is to the grid of this tube that the delayed pulse is fed from the buffer amplifier, which uses a 12AU7 as amplifier and cathode follower output.

In Fig. 3 a short delay line is shown as a physical component. However, it is sometimes not necessary to incorporate a special delay line as the buffer amplifier introduces some delay, which in some cases is sufficient to provide smooth operation. The block diagram of Fig. 2 denotes function and, of course, the delay results, regardless of whether it is lumped or distributed. It will be referred to in the claims as a "short delay circuit."

When counting particles of a predetermined particle size, the "short delay circuit" must of course be less than that corresponding to the time required for the scanning spot to pass from one edge of the particle to the other. Otherwise, the particle will not be counted. However, as is conventional in flip-flop circuits, there is a finite, even though very short, switching time in the flip-flop circuits. In other words, their response, as in practically all electronic circuits, is not instantaneous and, of course, the delay must be longer than the switching time. As the very short switching time of the flip-flop circuits will vary somewhat with the tubes and components used, no exact minimum delay time can be given for the circuit.

The description of Figs. 1–5 has been in connection with a raster scanning device in which a flying spot from a cathode ray tube scans the sample. This is, of course, not the only raster scanning method which can be used, and in Fig. 8 a different raster scanning method is illustrated, the same parts bearing the same reference numerals as in Fig. 1. A source of light 25 illuminates the sample 17 which is imaged by the lens 27 onto the face of a television camera tube 26, the scanning beam of which is timed by the sync generator 11 and which generates a signal output shown diagrammatically as developed across a resistance 20. The signal which contains information at video frequency is, of course, of the same type as in Fig. 1 and the counting proceeds exactly as described above.

Figure 8:
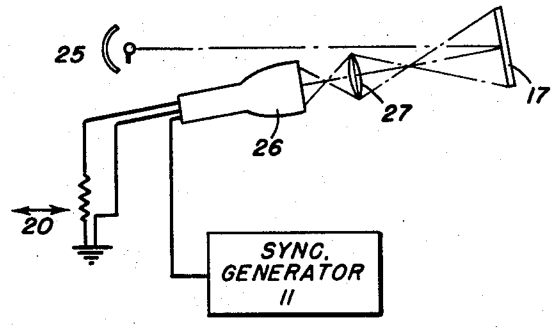
Fig. 8 is a block diagram of a modified scanner.

The raster scanning device shown in Fig. 8 has the additional advantage that it can be used to scan a sample by reflected light which is sometimes advantageous. This modification is shown in Fig. 8. Of course, in the case of a transparent sample, the camera tube would be arranged as the photomultiplier tube is in Fig. 1 to receive an image by transmitted light.

In the description above a counting circuit has been described in which the delay line is equal to a single horizontal scanning period. This gives the highest resolution possible with the equipment used and may be considered the preferred embodiment of the present invention. It will be obvious, of course, that the delay may be any multiple of the horizontal scanning period, and for some purposes it is desirable to have the guard beam delayed two or more horizontal lines. The operation of the circuits is, of course, the same, regardless of what multiple of a horizontal scanning period the delay represents.

In the description above a complete raster has been described, either by a flying spot or on the face of a television camera tube. For most operations this is the preferred embodiment of the invention. However, if there is a uniform flow of liquid through a hollow cell or a uniform movement of a sample, it is possible to scan only horizontally the movement of the sample or flow representing the vertical scanning. In each case a raster scanning results, regardless of whether the sample stands still and there is a vertical displacement of the scanning beam or whether there is no vertical displacement of the scanning beam but the sample moves. In each case a raster is traced out and the count proceeds as described above because the output from the photoelectric detector gives the same video frequency information in each case.

Figure 6:
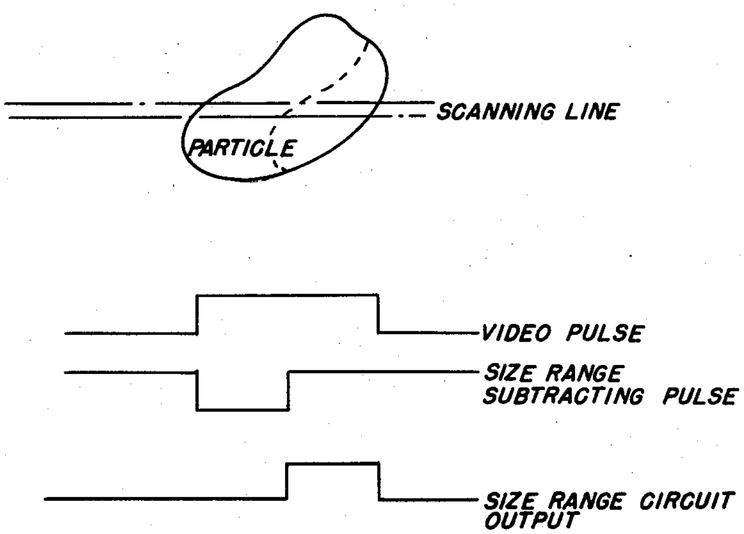
Fig. 6 is a plan view of a particle being scanned by two beams for differential counting and the wave forms associated therewith.

As has been pointed out above, it is desirable to obtain information with respect to particle size and, where an instrument is required which will provide this information, an additional circuit is introduced between the shaper 24 and the circuits in Fig. 2 to introduce a pulse of opposite phase to the scanning pulse and of variable duration. For the duration of the size range subtracting pulse no video signal passes to the input of Fig. 2. Fig. 6 shows such an operation. Only the portion of the particle to the right of the dotted line will produce a scanning pulse which passes into the delay line and the rest of the circuit. Particles which are not large enough to produce a scanning pulse of longer duration than the subtracting pulse will not be counted.

Figure 7:
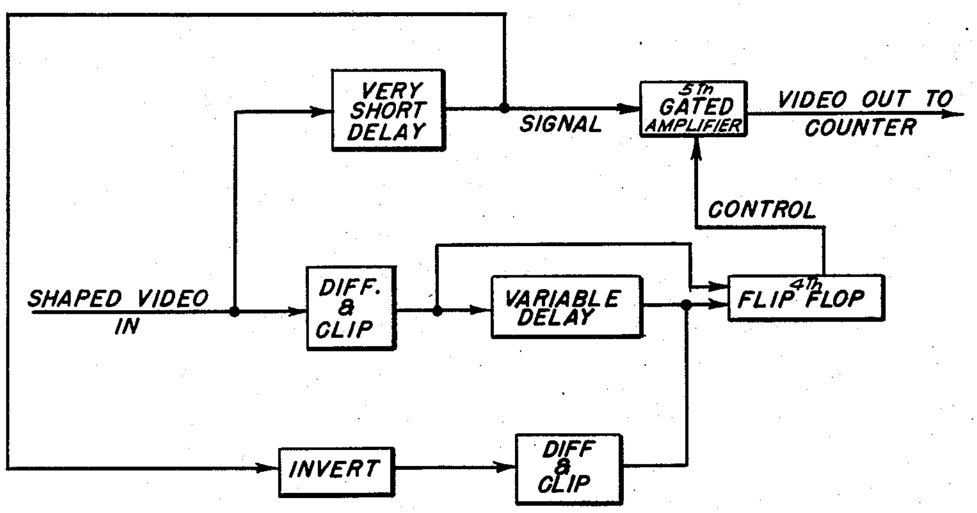
Fig. 7 is a block diagram of the circuit for differential particle size count.

Fig. 7 illustrates in block diagram the circuit for the size range subtracting pulse. The incoming scanning pulse is applied to two circuits, one going to a differentiating circuit, and the second through a very short delay line to an inverting circuit and then to a differentiating circuit. The very short delay line has a delay which is shorter than the time taken by the scanning beam to pass over the smallest size of particle which the instrument is capable of counting. This very short delay line, however, must introduce a finite delay at least equal to the switching time of the fourth flip-flop circuit described below. Each differentiating circuit includes a negative clipping diode. From the first differentiating circuit the positive pulse corresponding to the leading edge is fed directly to one tube of a flip-flop circuit and also to a variable delay line which is, of course, shorter than the main delay line separating delay beam from scanning beam. The output of this variable delay line and the positive pulse from the trailing edge in the second differentiating circuit are passed to the other tube of the flip-flop.

Fig. 6 illustrates pulse widths in which the scanning pulse width is about twice that of the subtracting pulse. The leading edge of the pulse triggers the fourth flip-flop which in turn closes the gate of the fifth gated amplifier, and no signal passes until the other half of the fourth flip-flop receives a positive pulse, either from the variable delay line or the trailing edge from the second differentiating circuit. If, as in Fig. 6, the duration of the video pulse is longer than variable delay, the fifth gated amplifier is opened while there is still a video signal on the input thereof. Video signal is therefore passed on to the circuits of Fig. 2. If the variable delay is longer than the video pulse, there will be no video on the fifth gated amplifier input when it is opened. As a result particles smaller than determined by the variable delay will not be counted.

In differential scanning, of course, the variable delay is set for a certain minimum particle size. A count is then made which will only count particles larger than this predetermined minimum. The circuit may be used to make a number of counts of different particle sizes by successive settings of the variable delay line so that a complete size range story can be obtained.

I claim:

1. In a particle counting device for counting particles above a predetermined size comprising a holder adapted to hold a sample in a predetermined plane, raster scanning means optically associated with said plane, a photoelectric detector for producing electric pulses at video frequency as discrete particles in the plane are scanned, an electronic counter therefor including a main delay circuit having a delay period equal to a multiple of a horizontal scanning period, feedback means from said main delay circuit to the raster scanning means to insure synchronous operation, and triggered gating means actuated by the output of the delay circuit to form a coincidence-anticoincidence circuit, counting taking place only when no pulse from the delay line output encounters the triggered gating means, the improvement which comprises a short delay circuit having a delay less than the time taken by the scanning means to pass over the smallest particle size to be counted but greater than the switching time of the triggered gating means and means for connecting a portion of a signal from said detector to the input of said circuit and to connect in proper phase the output of said circuit to the triggered gating means.

2. A device according to claim 1 comprising circuits in the input of the main delay circuit to transmit signals from predetermined particle size ranges, said circuits comprising a gated amplifier, the output of which is connected to the input of the delay circuit, a very short delay circuit in the signal input of the gated amplifier, a control means actuating the amplifier gate, connecting means from the video frequency pulse output to the very short delay line having a delay less than the time required by the scanning means to pass over the smallest particle size to be counted but greater than the switching time of the amplifier gate actuating means and to the gate actuating circuit in phase to close the gate, a circuit to the gate control circuit to open the gate, said circuit comprising a differentiating and clipping circuit and variable delay means, an additional circuit from the input to the gated amplifier to the output of the variable delay means, said circuit comprising inverting, clipping and differentiating means, the clipping being of a polarity to produce differentiated pulses of the same polarity as those in the output of the variable delay means whereby the gated amplifier is closed with the leading edge of a video frequency signal pulse and is not opened until a pulse from the variable delay means or the inverting, clipping and differentiating circuit actuates the gate.

3. A device according to claim 2 in which the gate actuating circuit is a flip-flop.

4. In a particle counting device for counting particles above a predetermined size comprising a holder adapted to hold a sample in a predetermined plane, raster scanning means optically associated with said plane, a photoelectric detector for producing electric pulses at video frequency as discrete particles in the plane are scanned, an electronic counter therefor including a delay circuit having a delay period equal to a multiple of a horizontal scanning period and triggered gating means actuated by the output of the delay circuit to form a coincidence-anticoincidence circuit, counting taking place only when no pulse from the delay circuit output encounters the triggered gating means, the improvement which comprises circuits in the input of the delay circuit, said circuits comprising a gated amplifier, the output of which is connected to the input of the delay circuit, a very short delay circuit in the signal input of the gated amplifier, a control means actuating the amplifier gate the delay of the very short delay circuit being less than the time required by the scanning means to pass over the smallest particle size to be counted but greater than the switching time of the amplifier gate actuating means, connecting means from the input to the very short delay circuit to the gate actuating circuit in phase to close the gate, a shunt circuit to a portion of the gate control circuit to open the gate, said shunt circuit comprising a variable delay line, a second shunt circuit from the input to the gated amplifier to the output of the variable delay means, said circuit comprising inverting, clipping and differentiating means, the clipping being of a polarity to produce differentiated pulses of the same polarity as those in the output of the variable delay means whereby the gated amplifier is closed with the leading edge of a signal pulse and is not opened until a pulse from the variable delay means or the inverting, differentiating and clipping circuit actuates the gate.

References Cited in the file of this patent

UNITED STATES PATENTS

| | | |
|---|---|---|
| 2,494,441 | Hillier | Jan. 10, 1950 |
| 2,789,765 | Gillings | Apr. 23, 1957 |
| 2,791,695 | Bareford et al. | May 7, 1957 |
| 2,791,697 | Dell | May 7, 1957 |
| 2,803,406 | Nuttall | Aug. 20, 1957 |

OTHER REFERENCES

"The Physics of Particle Size Analysis" from the British Journal of Applied Physics, Supplement No. 3, April 1954, Par. 1, page S123, Section 8, page S124, and pages S156 to S159.